Aug. 7, 1956    G. C. DOUGLAS ET AL    2,757,739
HEATING APPARATUS
Filed Jan. 7, 1952    5 Sheets-Sheet 1

Greig C. Douglas
Cordell Wagner
Ira J. Boydstun
INVENTOR.

BY Browning & Simms

ATTORNEYS

Aug. 7, 1956  G. C. DOUGLAS ET AL  2,757,739
HEATING APPARATUS

Filed Jan. 7, 1952  5 Sheets-Sheet 4

Greig C. Douglas
Cordell Wagner
Ira S. Boydstun
INVENTORS.

BY Browning & Simms
ATTORNEYS

United States Patent Office 2,757,739
Patented Aug. 7, 1956

2,757,739

HEATING APPARATUS

Greig C. Douglas, Cordell Wagner, and Ira S. Boydstun, Houston, Tex., assignors to Parelex Corporation, Houston, Tex., a corporation of Texas Application January 7, 1952, Serial No. 265,342

12 Claims. (Cl. 166—61)

This invention relates to an induction heating apparatus particularly adapted to be used to heat fluids in bore holes, casings, conduits and other objects to remove or prevent the deposition of clogging deposits of paraffin, asphalt, and the like. In one of its aspects, this invention relates to a method for forming an induction coil on a surface such as about a length of pipe.

In the oil industry, the problem of preventing or removing deposits of paraffin, asphalt and other high melting point substances from bore holes, flow tubing, flow lines and the like has frequently been encountered. In commercial practice, these deposits have been removed in the past by chemical action, scrapers, steaming, and various other methods. While such methods have been somewhat effective in securing the removal of the deposits, they have several disadvantages. One is that the removed material of the deposits must be ordinarily dumped in a tank where it settles as "bottoms" requiring subsequent removal from the tank. Also, in most of these methods, the cleaning is periodic in that the deposits are permitted to accumulate over a period of time and then removed. As a result, there is gradual clogging of the lines with resulting increased resistance to fluid flow and decreased efficiency of production. Another disadvantage of some of these methods, such as steaming, is that the flow lines are subjected to bending stresses and corrosion due to the high temperature effected during the operation.

While it has been suggested many times that various types of electrical heaters be employed as a substitute means for removing paraffin and the like from wells or flow lines, apparatus developed for such use to date has not been practical nor commercially successful for one reason or another. Some of these reasons include excessive cost of manufacturing the heating units, tendency of the units to deteriorate and break down during usage, excessive operating cost, and impracticability of installing the units in wells, flow lines, and the like without making provision for elaborate piping hookups and the like.

It is an object of this invention to provide an electrical induction heater which is efficient and reliable in operation and relatively cheap to manufacture, the heater being particularly adapted to be used in preventing and removing paraffin, asphalt and other high melting point deposits in bore holes, flow lines, flow tubing and the like.

Another object of this invention is to provide an electrical induction heater having a high power input per unit of length wherein a plurality of induction coils are spaced side by side along a conduit.

Another object of this invention is to provide an electrical induction heater wherein a number of induction heating coils are spaced side by side along a conduit, each coil comprising a plurality of layers of windings with the windings being in series in the same rotative direction.

Another object of this invention is to provide an electrical induction heater wherein a plurality of coils are wound for connection to a polyphase current source, the coils comprising a plurality of layers of windings wound for positive mutual inductance.

Another object of this invention is to provide a bore hole induction heater for oil wells adapted to be included as a part of the flow string from a well and to permit heating of the face of the bore hole and its contents by convectional circulation therethrough while the well is shut in and, if desired, to permit heating of the flow tubing as the well is being produced.

Another object of this invention is to provide a bottom hole heater adapted to be used in wells having high viscosity petroleum fluids therein which, at their ambient temperature, are exceedingly difficult to produce due to their high viscosity but which can have their viscosity reduced by the application of heat so as to be relatively easy to produce.

Another object of this invention is to provide such a bore hole heater wherein the induction coil is not subjected to action of well fluids and which can be placed in the well to be left there over extended periods of time so that the well can be periodically freed from paraffin, asphalt and like deposits or, if desired, can be maintained substantially free from the same by more or less continuous heating of the well fluids.

Another object of this invention is to provide a tubing induction heater for an oil well particularly adapted to heat oil as it is being produced to prevent deposition of paraffin, asphalt and the like in the flow tubing and to remove deposits of the same.

Another object of this invention is to provide a flow line induction heater wherein provision is made to heat the oil or other fluid flowing through the line and also to decrease radiant heat loss from the heater by causing fluid flow externally of the heating element.

Another object of this invention is to provide a method for forming an insulated induction coil on an object wherein a fibrous glass cloth-like material is used as an insulating medium and a thermosetting silicone resin varnish is employed, after baking with the fibrous glass, an additional insulating material and as a bonding agent for the glass fibers to cement the same into a unitary fluid-tight mass.

Another object of this invention is to provide a method for forming an insulated induction coil on an object wherein a cloth of fibrous glass material is deposited on the object, the coil placed thereover and then covered with additional fibrous glass material, the entirety being bonded into a unitary mass by a thermosetting silicone resin varnish baked to set the same.

Another object of this invention is to provide a method wherein strips of fibrous glass cloth are spirally wound about a pipe or the like with, if desired, overlapping of adjacent windings to build up the desired thickness of insulation, the induction coil being placed between succeeding layers of the windings and the strips being bound together to form a fluid resistant covering for the coil by baking a thermosetting silicone resin varnish impregnated into the strips.

Other objects, advantages and features of this invention will be apparent to one skilled in the art upon a consideration of the written specification, the appended claims and the attached drawings, wherein:

Figs. 8 and 8A are wiring diagrams of the induction heating coils of this invention connected in delta;

Figs. 9 and 9A are other wiring diagrams showing two coils connected in open delta;

Like characters of reference are used throughout the several views to designate like parts.

Figure 1:
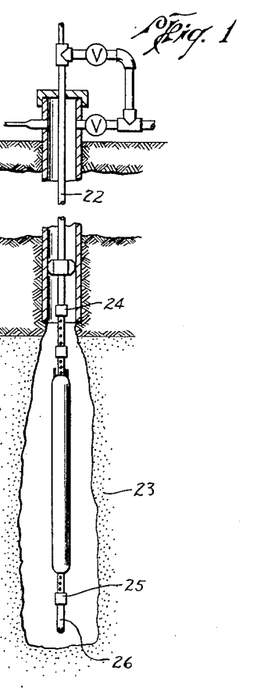
Fig. 1 illustrates one embodiment of the apparatus of this invention in use in the bore hole of a well.
Figures 4, 5, 6:
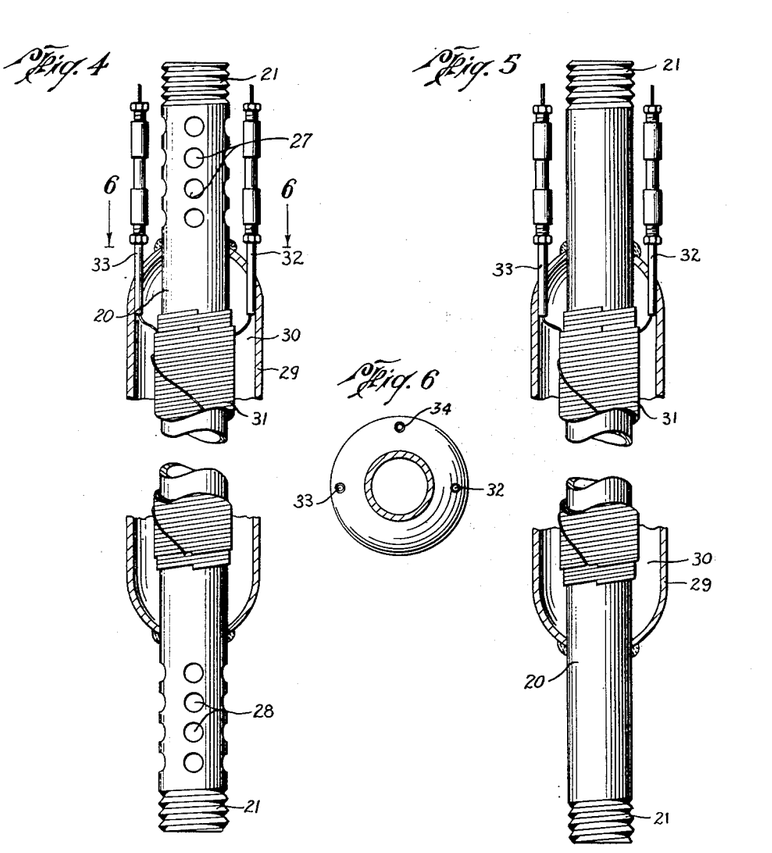
Fig. 4 is an elevational view, partially in cross-section, of the induction heating apparatus of Fig. 1.
Fig. 5 is a similar view of the induction heating apparatus of Fig. 2.
Fig. 6 is a view taken on the lines 6—6 of Fig. 4.

The induction heating apparatus illustrated in Figs. 1 and 4 is herein termed, for the sake of convenience, a bottom hole heater and comprises generally a conduit 20 having its ends adapted to be connected, such as by threads 21, as a part of a flow string 22 extending to the production zone 23 of a well. Such connection can be by means of collars 24 and 25 which connect the induction heater to the flow string 22 and a screen 26, respectively. A plurality of spaced apart openings 27 and 28 are provided through the walls of the conduit for communication from the interior to the exterior thereof. In this manner, a passageway is provided through the conduit 20 for circulation of oil therethrough by natural convection as it is heated which causes a decrease in its density as it passes through the conduit.

Surrounding the conduit is a jacket casing 29 forming an annulus 30 with the conduit and joined thereto intermediate the openings 27 and 28 so as to form a fluid-tight casing. Disposed around the conduit and within the casing is an electrical induction heating coil 31 adapted to heat the contents of the conduit and to cause the same to flow therethrough by the resultant change in density. This induction heating means is preferably formed in the manner hereinafter described. With this jacket construction, the jacket and the conduit constitute the secondary of a shorted transformer and will cause the jacket to heat externally thereof.

A plurality of connectors 32, 33 and 34 extend through the wall of the jacket casing and provide fluid-tight conduits for conducting the electrical wiring therethrough. These connectors can be formed in the manner shown in Figs. 11, 12 and 14 to be described hereafter.

In operation, the bottom hole heater is connected to flow tubing 22 as illustrated in Fig. 1, which can be below the pump conventionally used to pump oil from a well or the heater can be connected below gas lift valves employed to produce the well in a manner well-known to those skilled in the art. When so connected, the heater is immersed in the oil flowing into the bore hole from production zone 23. This oil will flow through openings 28 and screen 26 into the interior of conduit 20 to fill the same with liquid. Then upon application of current to electrical induction coil 31, the oil on the interior of the tube will be inductively heated to raise its temperature. As a result, the gravity of the oil will decrease with increased temperature so that the heated oil will tend to rise in the conduit and flow out of openings 27. Cool oil from the interior of the bore hole will flow through openings 28 to replace the heated oil, thereby causing circulation through conduit 20. Additionally, the jacket heats oil externally thereof and, if the well is cased, the casing will also be heated by induction coil 31 an amount dependent upon the spacing from the coil. As the oil in the bore hole becomes heated, the heat will be conveyed by convection currents of the oil to the face of the bore hole and in particular to the face of producing zone 23 which will cause any paraffin, asphalt or other deposits to be melted therefrom and to become dissolved in the heated oil. The oil will, of course, increase its solvent power for these paraffinic and asphaltic deposits as its temperature is raised so that as a result of the heating operation, solutions of the deposits will be formed which can be removed from the well. It is to be noted that with the heater situated opposite a producing formation as in Fig. 1, the heated oil will circulate downwardly past the face of the bore hole to scrub the same while applying heat thereto. This not only causes deposits of paraffin and the like to become melted but also tends to wash the same from the formation.

Another very useful application for this bottom hole heater has been found to be in conjunction with the production of certain high viscosity petroleum fluids. Thus, certain naphtha crudes and mixed base crudes have a Saybolt viscosity between 20,000 and 50,000 seconds at a bottom hole temperature of 100° F. These crudes cannot be produced except with great difficulty. However, upon heating of such crudes to a temperature of say, 200° F., their Saybolt viscosity will often drop to a value of 500 seconds or even less. At such viscosity, the crudes can be produced with conventional equipment, and, in some instances, they can be economically produced at a higher viscosity. Thus, the bottom hole heater can be employed to heat such crudes to a temperature sufficiently high to assure a feasible viscosity for production.

Figure 2:
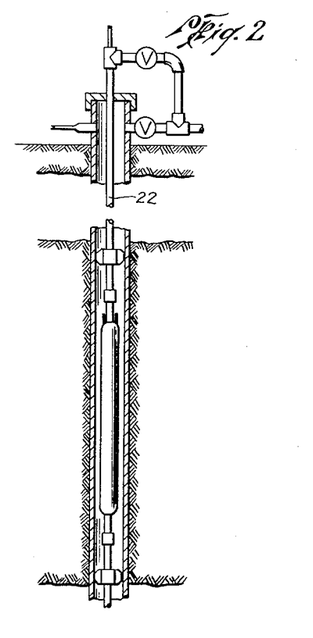
Fig. 2 illustrates a similar embodiment in use in the flow tubing of a well.

As oil flows upwardly through a production string in a well, the pressure thereof tends to decrease due to the lessening of hydrostatic head and this results in the expansion of the oil and cooling of the same. As a result, paraffinic and asphaltic deposits may tend to accumulate on the flow tubing 22. To prevent the deposition of such deposits or to remove the same after they have been formed, there is provided a flow tubing heater as illustrated in Figs. 2 and 5. The construction of this heater is similar to that of Figs. 1 and 4 except that openings 27 and 28 of the latter are omitted. Due to this similarity of structure, further description of the embodiment of Figs. 2 and 5 will not be given. The operation of this embodiment of the flow tubing heater can be continuous or periodic and the heater can be used alone or in conjunction with the bottom hole heater of Fig. 1. When either of these heaters are used so as to have a sucker rod or the like running through their inner conduit 20, it has been found that this rod will become quite hot so that it acts as an effective and supplementary heating member.

With continuous use, the oil flowing through the flow tubing and through conduit 20 of Figs. 2 and 5 is heated merely sufficiently to prevent the deposition of the high melting point constituents of the oil onto the flow tubing above the heater and no effort is made to heat the oil to a temperature sufficiently high to dissolve any deposits thereabove since these deposits are prevented from forming by the continuous use of the heater. In many circumstances, however, it is more economical to use the heater periodically. Under such circumstances, the deposits are permitted to form in the flow tubing and then, while the well is being flowed, current is applied to the induction coil 31 of Fig. 5 to heat the oil flowing through the flow tubing to a temperature sufficiently high to dissolve the deposits in the flow tubing thereabove. Since the removal of deposits in this fashion is by increasing the solvent capacity of the oil for the deposits and not by melting the deposits and then mechanically disbursing the melted material in the oil, true solutions of the paraffin, asphalt and the like in the oil are formed. It has been found that these solutions can usually be passed into run tanks without redepositing the paraffin or asphalt from the oil. The exact reason for this phenomenon is not known, but it has been found that even though the temperature of the oil in the tank is reduced a small amount, say 10° F. below the temperature at which the oil formed a deposit in the flow tubing, there still will not be formed any substantial deposits in the tanks.

Another method for operating these heaters is to shut the well in while the heater is in operation. Then after the oil in the vicinity of the heater has been raised to a substantially higher temperature, the well can be opened to flow so that the hot "slug" of oil can be passed upwardly through the flow tubing as a more or less unitary body. In this manner, the oil can be heated to a much higher temperature with the same size heater than it can with continuous flow. This method of operation is particularly useful in removing very tenacious deposits.

Figure 3:
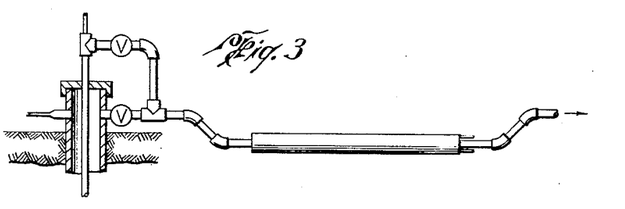
Fig. 3 illustrates a still further embodiment connected in a flow line leading from a well or other source of high melting point containing fluid.
Figure 7:
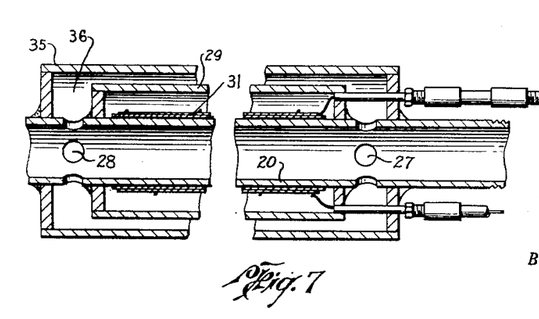
Fig. 7 is a view, partially in cross-section, of the induction heating apparatus of Fig. 3.

In accordance with another aspect of this invention, there are provided flow line heaters particularly adapted to heat a fluid, such as oil, passing from a fluid source through a pipe line as illustrated in Figs. 3 and 7. These flow line heaters are constructed similarly to the heaters of Figs. 1 through 6 in that there is provided a conduit 20 having spaced apart openings 27 and 28 through its wall to provide communication with the interior thereof as well as a jacket casing 29 joined to the conduit intermediate the openings and housing an induction heating coil 31. However, in addition to the structure of Fig. 4, there is provided a second jacket casing 35 exterior of jacket casing 29 and joined to the conduit 20 on the sides of openings 27 and 28 which are opposite from the joinder of jacket casing 29 to conduit 31. In this manner, there is formed an annulus 36 between the two jacket casings to provide a passage for circulation of fluid from conduit 20 through openings 28 and annulus 36 back into the conduit through openings 27.

The operation of the apparatus of Fig. 7 is believed to be apparent from the foregoing. Fluid passing through the conduit will be heated by induction coil 31. A certain amount of the fluid passing through the conduit will flow through openings 28 into annulus 36 and thence around the exterior of the jacket casing 29 into openings 27 to absorb any heat which may be radiated from the induction heating coil. In this manner, a very efficient method of operation is provided and one which does not have appreciable radiant heat losses. This is particularly advantageous when these flow line heaters are used in low temperature climates conducive to high radiant heat losses. With such construction, it is not necessary to insulate the flow line heater to conserve heat.

Referring now to Figs. 8 to 10 and 8A to 10A inclusive, there is shown a plurality of embodiments of wiring diagrams for induction heating coils adapted to be used with a polyphase current source. It has been found that these coils can very effectively heat liquids when used in accordance with this invention with a relatively low frequency current. In fact, excellent results are achieved with ordinary 60 cycle current at voltages of 110 to 440 or higher. For example, with 220 volt, 60 cycle current, a power factor of 0.9 has been obtained. Thus, the coils of this invention are preferably wound for use with a 60 cycle current.

These coils are so constructed and arranged as to each comprise a multiplicity of layers of windings in order to conserve space and to permit the use of polyphase current without loss of power through negative mutual inductance and without developing temperatures within the interior of the coils which would cause breakdown of insulation.

In general, each coil comprises a plurality of layers of windings, one on top of the other, the windings of the several layers being in series in the same rotative direction. Referring to the drawings, the first layer 40 of windings of each coil is wound, for example, in a counterclockwise direction from left to right as viewed in the drawings. After this layer has been wound, the wire is brought back around to the beginning of the layer and a second layer 41 wound in the same rotative direction from left to right. This process is repeated for the third layer 42. In this manner, there is provided a plurality of layers of windings 40, 41 and 42 all wound in the same rotative direction with the beginning of one layer at the same side of the coil as the beginning of the other layers. The end winding of layer 40 is connected to the first winding of layer 41 by means of a wire 43 and the end winding of layer 41 is connected to the first winding of layer 42 by wire 44. Since all of the coils of Figs. 8 to 10 are wound as just described, further description thereof will not be given.

Figure 8:
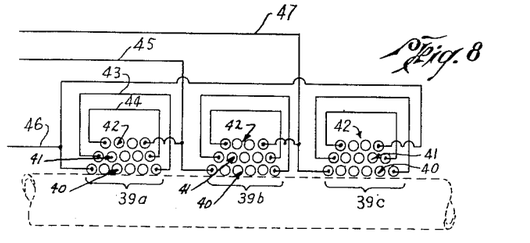

Referring to Figs. 8 and 8A, the coils 39a, 39b and 39c are joined in delta fashion by lead wires 45, 46 and 47. With the connection in such fashion, the coils will be connected for positive mutual inductance, as will the individual layers of each coil, and it has been found that when the multi-layer coils are constructed in this manner, the temperature rise interiorly of the coils is not sufficient to substantially decrease the inductive heating capacity thereof nor to cause decomposition of the insulation material of the coils.

Figure 9:
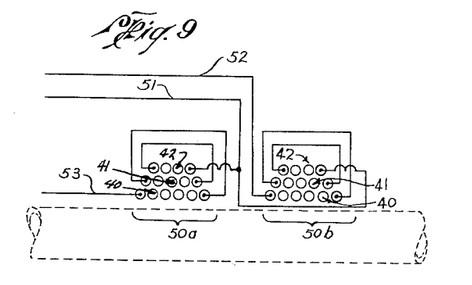

Referring to Figs. 9 and 9A, there is shown two coils 50a and 50b, wound as above described for coils 39a, 39b and 39c, and connected in open delta by lead wires 51, 52 and 53. This type of construction is particularly useful when low heating loads are required and it is desired to conserve the amount of wire forming the coils.

Figure 10:
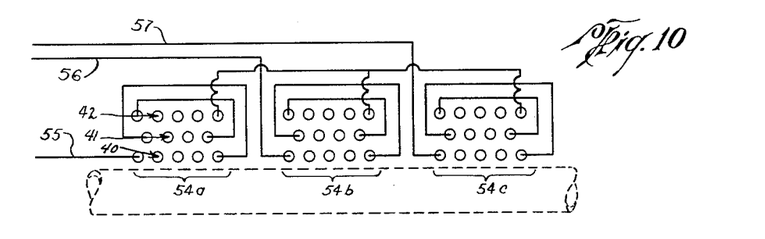
Figs. 10 and 10A are wiring diagrams of coils shown connected in Y.
Figures 10A, 11:
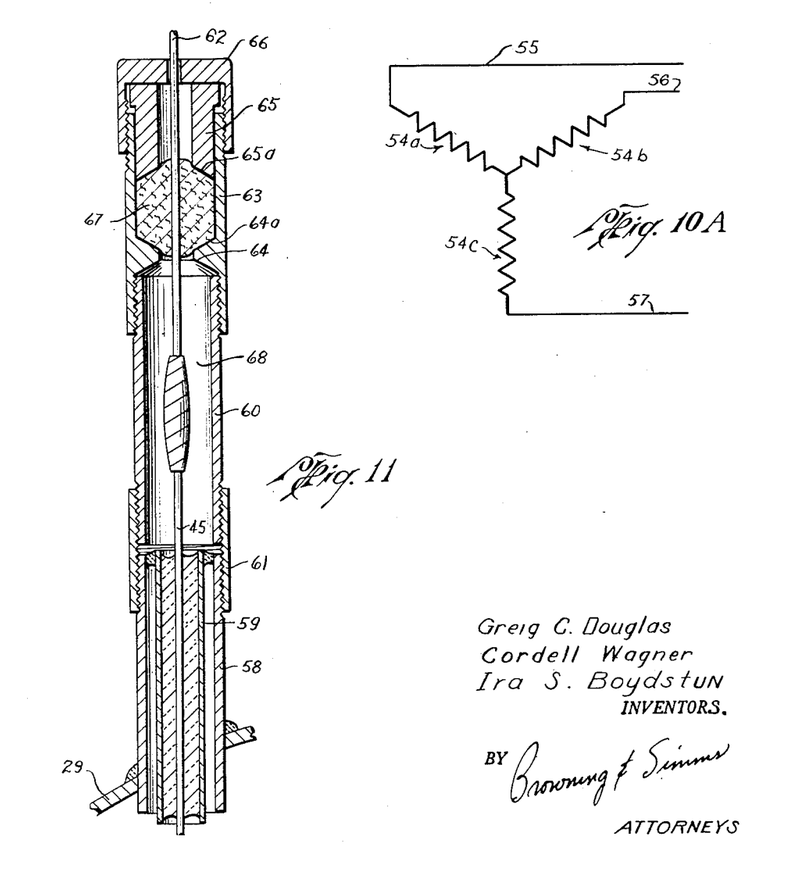
Fig. 11 is a cross-sectional view of a connector for use with the induction heating apparatus of this invention.

In Figs. 10 and 10A, there is illustrated three multi-layer coils 54a, 54b and 54c also wound as above described and connected in Y by lead wires 55, 56 and 57.

In the polyphase connections, each of the coils are preferably constructed to be of equal impedance so that balanced load conditions will obtain in the various coil combinations. Also each of the individual coils are wound in the same rotative direction as the other coils and are preferably spaced from an adjacent coil sufficiently that mutual inductance between the coils, though existent, is comparatively small. Such spacing is usually from four to six inches but where space is at a premium, the coils can be more closely spaced.

In Fig. 11 there is illustrated the construction of a preferred connector adapted to furnish a conduit for the connecting wires to pass through the jacket casings of the various heaters and to house splices between such wires and external wires leading to a source of current. The position of these connectors is indicated in Figs. 4 to 7 by the numerals 32, 33 and 34, one being supplied for each of the three lead wires of the three phase systems illustrated. The connector includes a conduit stub 58 sealingly connected through jacket casing 29 and extending therebeyond in a direction parallel to the longitudinal axis thereof. Inside of the conduit stub is a tube 59, substantially coextensive therewith and held in place as by brazing. The lead wire from the individual induction coil, such as wire 45, passes through tube 59 and is packed off and insulated therefrom by a suitable temperature resistant insulation material such as magnesium oxide. The material should be resistant to temperatures of the order of 200° F. and substantially impervious to water, oil and other liquids which the heating apparatus is likely to contact.

To the outer end of conduit stub 58 is connected a nipple 60 by means of a coupling 61. At the outer end of the coupling is a packing means through which is received a wire 62 for splicing with lead wire 45 within nipple 60. Such packing means can comprise a housing 63 sealingly connectable to nipple 60 and having an inwardly extending annular shoulder 64 preferably with walls 64a forming an obtuse angle with the inner walls of the housing so as to slope away from such inner walls and toward the central axis of the housing. Receivable in the end of the housing is a follow-up member 65 having a central bore and whose end 65a slopes inwardly away from the inner wall of the housing to form an obtuse angle therewith. A packing nut 66 is adapted to be screwed down over the housing to force follow-up member 65 thereinto in order to compress a packing material 67, such as mica-asbestos rope, around wire 62 and against the inner walls of the housing to form a fluid-tight seal. With this construction, there is provided a fluid-tight chamber 68 to house the splice and each of the wires forming the splice are separately sealed against fluid flow through the connector.

The operation and use of this connector can be achieved by merely placing nut 66, member 65, housing 63 and nipple 60 over wire 62 and then making the splice with wire 45 which has previously been positioned as above described. Then nipple 60 can be made up into coupling 61 and housing 63 screwed to the nipple. After placing placking 67 in place, the follow-up member and nut 66 can be secured in place to pack off wire 62.

Figure 12:
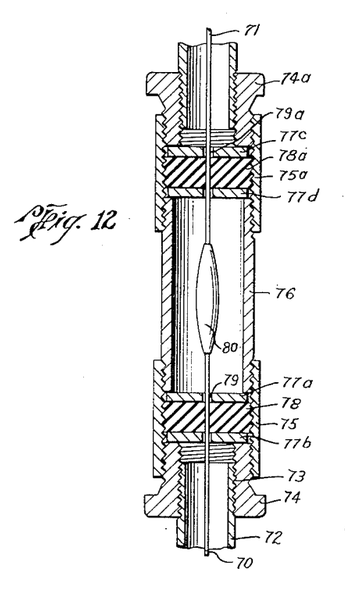
Fig. 12 is another embodiment of such connector.

Referring to Fig. 12, there is illustrated another embodiment of a connector adapted to be used similarly to that of Fig. 11 to form a weather-tight housing for a splice between a lead wire 70 leading from one of the induction coils of this invention and an external wire 71 which is connected to a source of current. In this connector, there is provided a conduit 72 adapted to be fastened as by welding to jacket casing 29 in Figs. 4, 5 and 7 and having its outer end threaded at 73. Screwed to this conduit is a bushing 74 bearing a coupling 75 on its outer threads. A nipple 76 joins coupling 75 to a similar coupling 75a and a bushing 74a. Disposed within couplings 75 and 75a and between nipple 76 and bushings 74 and 74a, respectively, are pairs of endwise facing washers 77a through 77d. Washers 77a and 77d are adapted to abut against the end of coupling 76 while washers 77b and 77c are adapted to abut against the end of bushings 74 and 74a, respectively. Disposed between each pair of washers is rubber sealing elements 78 and 78a. The washers and sealing elements have centrally disposed openings 79 and 79a therethrough for wires 70 and 71, respectively.

In using this connector, wire 70 can be inserted through washers 77a and 77b and rubber sealing element 78 to extend thereabove. In a similar manner, wire 71 can be passed through washers 77c and 77d and rubber sealing element 78a, it being understood that couplings 75 and 75a have not as yet been joined together by nipple 76. After the wires have been inserted through these sealing elements, a splice 80 can be made therebetween after which nipple 76 is screwed into coupling 75 to bear against washer 77a and thereby cause rubber sealing element 78 to expand laterally and, during such expansion, to decrease the size of the opening therethrough and become wedged in fluid-tight relationship around wire 70 and against the threads of coupling 75. After this has been done, coupling 75a can be made up on nipple 76, and bushing 74a tightened to expand sealing member 78a laterally and form a fluid-tight seal with wire 71 and the threads of coupling 75a.

It will be apparent from this discussion that the connector of Fig. 12 not only prevents flow of fluid inwardly of jacket casing 29 but also provides a fluid-tight chamber formed by a conduit having its ends sealed by two expansible elastic sealing elements, the chamber being adapted to contain a splice between two wires extending through the sealing elements.

Figure 14:
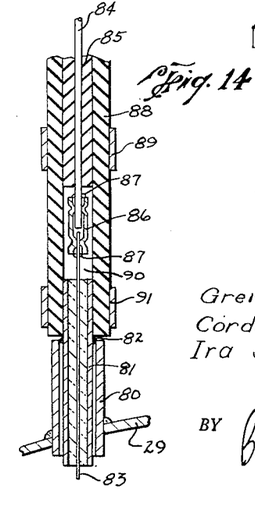
Fig. 14 is still another embodiment of a connector.

In Fig. 14 is shown a connector which is simple to assemble and not subject to damage during assembly by unskilled workers. A stub conduit 80 is fixed to jacket casing 29 and has an internal coaxial conduit 81, preferably of copper, joined and sealed thereto as by brazing 82. The lead wire 83 from one of the inductance coils is passed through conduit 81 and sealed with a packing material such as magnesium oxide in a manner similar to the packing in conduit 59 of Fig. 11. The current supply wire 84, having insulation 85 thereround, is joined by wire 83 by a conduit connector 86, preferably of copper and crimped at each of its ends around the end of wires 84 and 83. The ends of connector 86 can be soldered to the wires as at 87. Disposed to extend over conduit 81 and insulation 85 is a flexible conduit 88 made preferably of oil resistant rubber such as neoprene. This flexible conduit is clamped to insulation 85 and conduit 81 to form a fluid-tight seal by means of clamps 89 and 91. The interior 90 of the flexible conduit can be filled with a high dielectric strength, heat resistant silicone grease or jelly.

To assemble this connector, it is merely necessary to slide flexible conduit 88 over insulation 85 until the end of wire 84 is exposed after which wires 84 and 83 can be joined by crimping connector 86 to each and soldering the latter's ends, if desired. Space 90 can then be filled with the silicone jelly and conduit 88 slid over conduit 81 and clamped in place.

One advantage of this connector is that there will not exist any substantial pressure differential between its interior and exterior which would tend to cause leaks. Thus, when pressure is applied to its exterior, flexible conduit 88 is collapsed until the pressure interior thereof equalizes with the exterior pressure. This is particularly effective when space 90 is filled with a flowable grease or jelly. When such a connector is used in oil wells, the pressure will, of course, be atmospheric at the surface of the bore hole but may and often does increase to several thousand pounds per square inch at the bottom of the hole. Despite such wide pressure variations, this connector has a minimum tendency to leak even though the joints between flexible conduit 88 and insulation 85 or conduit 81 are not made up to withstanding a high pressure differential. It is contemplated that should the inner diameter of conduit 88 be considerably larger than the outside diameter of the conduit or insulated wire to which it is to be connected, a conduit shim can be placed therebetween and beneath the clamp.

Figure 13:
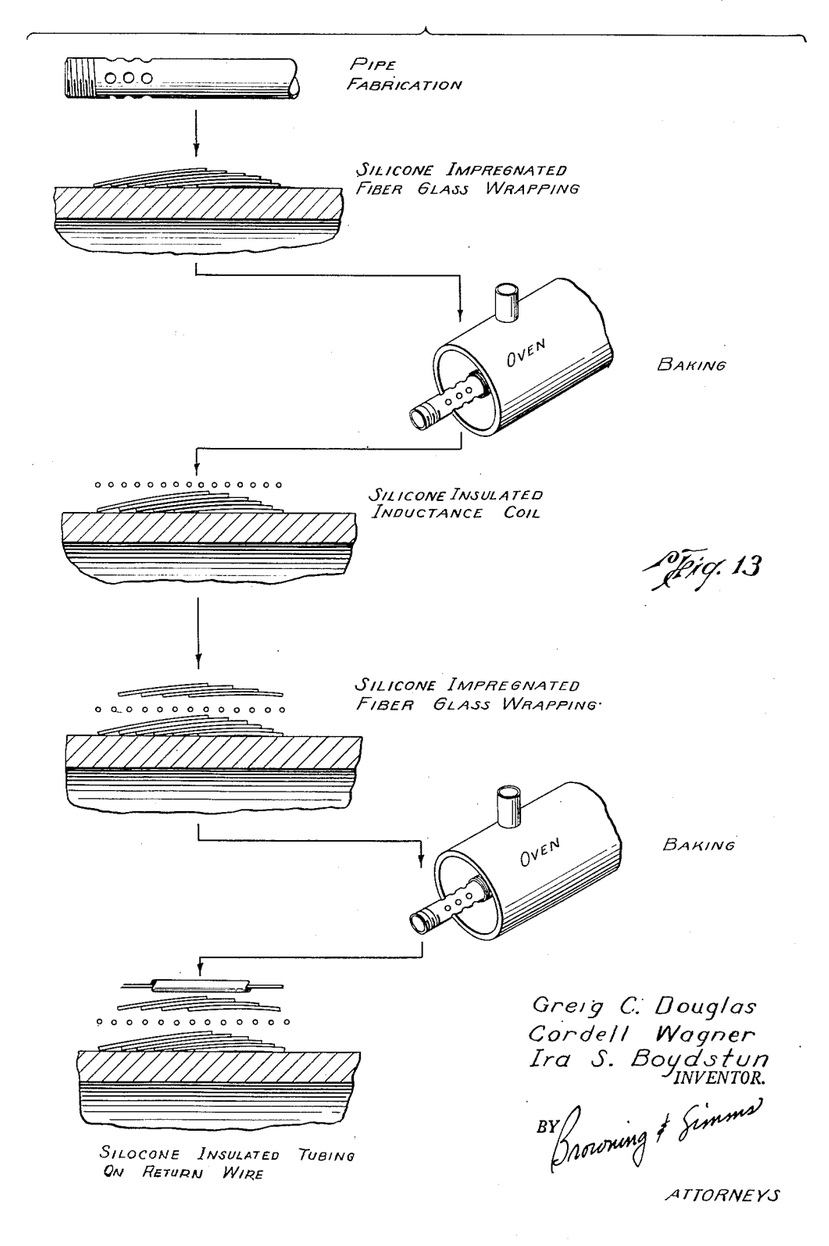
Fig. 13 is a schematic flow diagram of the method of this invention for forming insulated induction coils.

Referring now to Fig. 13 wherein there is shown schematically the coil forming method of this invention, the steps illustrated therein forming a preferred embodiment of the invention, and it will be apparent to one skilled in the art from the following description that certain of these steps can be combined or rearranged to arrive at a product similar to the one obtained by following the illustrated sequence of steps.

After the conduit or pipe has been fabricated to provide the conduit 20 of Fig. 4, for example, the surface of the pipe is first covered with a fibrous glass material in the form of a cloth. Such covering can be formed by wrapping a sheet of fiber glass cloth or other compact glass fiber product around the surface. As illustrated in Fig. 13, the first layer of insulation is formed by wrapping a strip of fiber glass cloth or tape spirally around the pipe with each succeeding turn overlapping a preceding turn. The extent of overlap can be adjusted to achieve the desired thickness of insulation. In a preferred embodiment, the strips overlap five-sixths of a preceding strip so that the final insulation layer is equivalent in thickness to six thicknesses of the cloth. Prior to wrapping the pipe, however, the cloth is dipped or otherwise impregnated with a thermosetting silicone resin varnish and the cloth wrapped on the pipe while still in a moistened condition and before the resin varnish has set. After the desired length of wrapping has been deposited on the pipe, the pipe is placed in a baking oven wherein it is heated to a temperature sufficiently high to set the thermosetting silicone resin and thereby cement the fibers of the glass cloth together and to cement the various layers of the strips together in a fluid-tight unitary mass. After baking in the oven, the glass fiber wrapping is firmly attached to the pipe and the individual windings of the wrapping cannot be moved with respect to other windings without the application of considerable force.

In the next step of the method, the induction coil is wound over the first layer of fiber glass insulation. This winding can be achieved by mounting the pipe in a coil winding machine and then guiding the wire onto the pipe to form spiral windings therearound with the desired spacing between the individual turns of the coil. In a preferred embodiment, the coil is formed of suitable wire insulated with a covering of silicone impregnated glass fibers which has been previously baked thereon to form a tightly adhering moisture-proof covering.

After the coil has been formed over the first layer of insulation, a second silicone impregnated layer of glass cloth is deposited over the coil to completely insulate the same and to hold the individual turns of the coil in proper spaced position with respect to other turns. The second layer of insulation can be formed in a manner similar to the first by wrapping a strip of fiber glass cloth spirally over the coil in overlapping relationship between the individual turns thereof. In its preferred embodiment, the second layer is wound to a lesser thickness than the first layer by overlapping the individual strip windings of the second layer only three-fourths of the preceding winding to form a layer having a thickness equivalent to four thicknesses of the cloth. This layer, as in the first layer, has been previously impregnated with a thermosetting silicone resin varnish and after the winding is completed, the pipe is again placed in an oven and baked to set the silicone resin. In so doing, the resin will bind the fibers of the second layer of glass cloth together and also bind the individual layers of the insulation coating together into a unitary mass. Further, a certain amount of bonding will be achieved between the second layer of insulation and the turns of the coil, and even of the second layer to the first layer of insulation, thereby forming a unitary mass which is moisture-resistant.

Additional layers of induction heating coils and impregnated fiber glass insulation cloth can be deposited over the first layer and second layer by alternately wrapping the coil and insulation around the last layer deposited on the pipe. After the final layer has been formed, lead wires or return wires can be joined to the coil and then passed longitudinally of the wrapped portion of the pipe to one end thereof to be connected to a source of current. These lead wires can be tacked to the pipe at intervals to prevent their moving around and protruding or looping unecessarily away from the surface of the pipe. If desired, a final layer of fiber glass wrapping can be placed over the lead wires to completely inclose the induction coil. This final layer can be impregnated and baked as in the preceding layers.

It is contemplated that the fiber glass cloth can be wrapped on the pipe first and then impregnated with silicone resin varnish by dipping the pipe in a bath thereof or by other suitable means. Further, the various layers of fiber glass cloth and induction coil can be wound on the pipe, the glass cloth being previously impregnated or not, and then impregnated as a unit and baked as a unit.

The silicone resin varnishes to be used as an impregnant and binder in accordance with this invention are commercially available products recommended by their manufacturers for electrical insulation purposes. These varnishes comprise a polymerized organo-silicon compound dispersed or dissolved in aromatic, chlorinated, esterified or aliphatic hydrocarbons such as cyclohexanone, xylene, xylol and the like. The silicone resins usable in this invention comprise such compounds as polymerized methyl silicone, chlorinated aromatic silicones and alkaryl silicones selected by their known characteristics have the property of thermosetting at elevated temperatures in particular, such as at temperatures within the range of 300° F. to 600° F. when baked for a period of ten minutes to three hours. Also, the selected resin should be heat stable and not subject to rapid deterioration at temperatures below 500° F., preferably within the range of 200° F. to 500° F., depending upon the temperature at which the induction heater coils are to be used. It has been found that such silicone resin varnishes as Dow Corning 993 and Dow Corning 996 are pre-eminently satisfactory.

From the foregoing it will be seen that this invention is one well adapted to attain all of the ends and objects hereinabove set forth, together with other advantages which are obvious and which are inherent to the structure and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

This invention having been described, what is claimed is:

1. An induction heating apparatus which comprises, in combination, a conduit having spaced apart openings from its interior, a fluid tight jacket casing around a length of said conduit and joined thereto intermediate said openings, a plurality of induction heating coils around said conduit within said casing, said coils being spaced side by side along said conduit and each comprising a plurality of layers of windings, one on top of the other, the windings of the several layers being in series in the same rotative direction, and electrical leads from each coil to the exterior of said casing.

2. The apparatus of claim 1 wherein said coils are connected in delta.

3. The apparatus of claim 1 wherein said coils are connected in three phase Y.

4. An induction heating apparatus which comprises, in combination, a conduit having spaced apart openings from its interior, a fluid tight jacket casing around a length of said conduit and joined thereto intermediate said openings, a plurality of induction heating coils spaced side by side around said conduit within said casing, each of said coils comprising a plurality of layers of windings, one on top of the other, the windings of the several layers being in series and in the same rotative direction, and electrical connections from each coil for connecting the same with a polyphase current for positive mutual inductance.

5. An induction heating apparatus which comprises, in combination, a conduit having spaced apart openings from its interior, a fluid tight jacket casing around a length of said conduit and joined thereto intermediate said openings, a plurality of induction heating coils around said conduit within said casing and spaced side by side, each of said coils comprising a plurality of layers of windings, one on top of the other, with the windings in each layer being in the same rotative direction as the windings in the other layers of the coil, connections between the last winding of a layer to the first winding of another layer in the same coil to connect the layers in series, and connections between the first and last windings of each coil to connect the coils for positive mutual inductance as part of a polyphase inductive heating circuit.

6. The apparatus of claim 5 wherein the coils are connected in delta.

7. The apparatus of claim 5 wherein the coils are connected in open delta.

8. The apparatus of claim 5 wherein the coils are connected in Y.

9. The apparatus of claim 5 wherein said conduit has imperforate walls.

10. An induction heating apparatus which comprises, in combination, a first conduit adapted to have at least one of its ends joined to a second conduit, said first conduit having spaced apart openings through the wall thereof to permit circulation of fluid through a substantial length of the interior of said conduit, a fluid tight jacket casing around said conduit being joined thereto intermediate said openings, a plurality of induction heating coils spaced side by side along said conduit within said casing, each of said coils comprising a plurality of layers of windings, one on top of the other, the winding of the several layers of each coil being in series in the same rotative direction, and electrical connections to each coil for connecting the same for positive mutual inductance when using a polyphase current as a power source therefor.

11. The apparatus of claim 10 in combination with a second fluid tight jacket casing around first said jacket casing, the second jacket casing being joined to the conduit on the opposite side of said openings from first said jacket casing so that said openings establish communication between the interior of said conduit and the annulus formed between said jacket casings.

12. An induction heating apparatus which comprises, in combination, a conduit adapted to be made up in a flow line and having an inlet and outlet and longitudinally spaced apart lateral openings through its walls, a first fluid tight jacket casing around said conduit and sealingly joined to said conduit at two points adjacent said openings and intermediate thereof, an induction heating means around said conduit within said first jacket casing, and a second fluid tight jacket casing around said conduit and said first jacket casing, said second jacket casing being sealingly joined to said conduit at two points on the opposite side of said openings from the joinder of said first jacket casing to said conduit so that said openings provide communication between the interior of said conduit and the annulus between said jacket casings.

References Cited in the file of this patent

UNITED STATES PATENTS

| | | |
|---|---|---|
| 522,737 | Lucock | July 10, 1894 |
| 1,934,955 | Thrupp | Nov. 14, 1933 |
| 2,035,306 | Fannin | Mar. 24, 1936 |
| 2,302,774 | Jarvis | Nov. 24, 1942 |
| 2,332,708 | Freeman | Oct. 26, 1943 |
| 2,430,640 | Johnson | Nov. 11, 1947 |
| 2,472,445 | Sprong | June 7, 1949 |
| 2,484,063 | Ackley | Oct. 11, 1949 |
| 2,500,305 | Ackley | Mar. 14, 1950 |
| 2,505,104 | D'Orio | Apr. 25, 1950 |
| 2,570,786 | Flynn et al. | Oct. 9, 1951 |
| 2,669,647 | Segsworth | Feb. 16, 1954 |